Feb. 19, 1957 L. A. GILLILAND 2,781,713
COTTON CHOPPERS
Filed June 25, 1953

INVENTOR.
Lonnie Alvis Gilliland
BY Chas. Denegre
Attorney.

United States Patent Office 2,781,713
Patented Feb. 19, 1957

2,781,713
COTTON CHOPPERS

Lonnie Alvis Gilliland, Detroit, Ala.

Application June 25, 1953, Serial No. 364,080

1 Claim. (Cl. 97—213)

This invention relates to a cotton chopper. It has for its main objects to provide such a chopper that will be highly satisfactory for the purpose intended, simple in structure, comparatively cheap to manufacture, easy to operate and keep in proper condition for use, and extremely durable.

A further object is to provide a chopper adapted to be secured to a tractor or tractor drawn cultivator from which it will receive its rotating power as pulled along.

The main feature of a cotton chopper is the revolvable blade assembly. The present invention comprises a very much improved one in its class.

Figure 1:
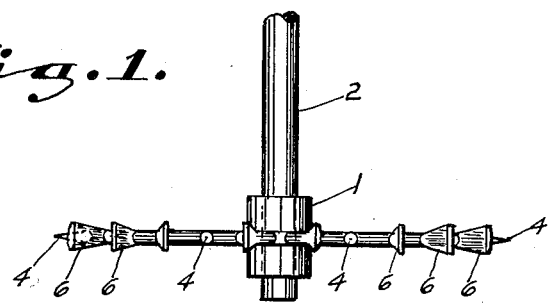
Figure 2:
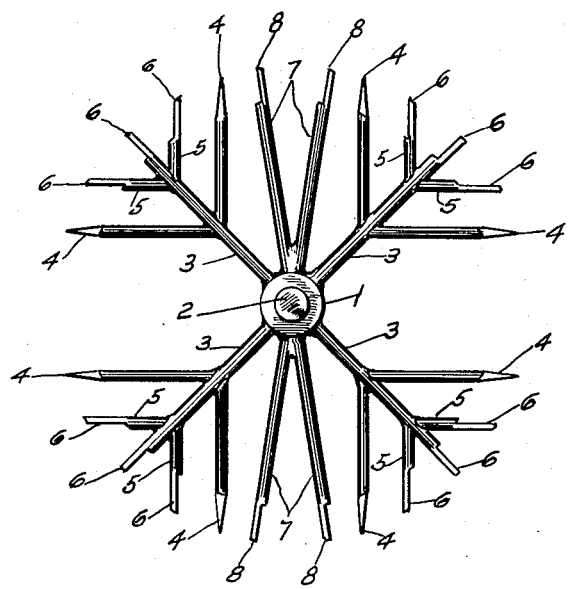

By referring generally to the drawing it will be observed that Fig. 1 is a plan view of a chopper blade and shaft made according to the present invention; and Fig. 2 is a front elevational view of the blade assembly.

Similar reference numerals refer to similar parts throughout the views.

Referring to the drawing in detail it will be seen that the blade assembly comprises a hub 1 adapted for attachment on a shaft 2 for the purpose of being revolved. The hub is provided with an integral main bar 3 extending outward from each quarter position on the face of the hub, and each main bar has two integral bars extending from its middle portion and opposite each other at an angle of approximately 45 degrees compared to the plane of the main bar. Each of said second integral bars has a pointed end 4. There are two additional integral bars 5 extending from the main bar at the same angle and positioned approximately midway between the said second bars and the end of the main bar, there being two on each main bar or in other words four sets. The said third bars and the end of each main bar having their ends 6 formed flat. There are two additional bars 7 extending from each of two sides of the hub with the ends 8 of each formed flat. All of the said main bars and the additional bars have the same radius to thus extend to the same circumference edge of the assembly.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A cotton chopper of the character described comprising a hub adapted for attachment on a shaft for the purpose of being revolved, said hub having an integral main bar extending outward from each quarter position on the circumference face of the hub, each main bar having two integral bars extending from its middle portion and opposite each other at an angle of approximately 45 degrees compared to the main bar, each of said second integral bars having a pointed end; two additional integral bars extending from the main bar at the same angle and positioned approximately mid way between the said second bars and the end of the main bar, the said third bars and the end of each main bar having their ends formed flat; two additional main bars extending from each of two sides of the hub with the ends of each being formed flat; all of said main bars and additional bars having the same radius to thus extend to the same circumference edge.

References Cited in the file of this patent

UNITED STATES PATENTS

| | | |
|---|---|---|
| 1,718,818 | Hanson | June 25, 1929 |
| 2,148,916 | Urshel | Feb. 28, 1939 |
| 2,260,685 | Schmitz et al. | Oct. 28, 1941 |
| 2,479,510 | Pollard | Aug. 16, 1949 |
| 2,516,794 | Neel | July 25, 1950 |
| 2,526,396 | Nowlin | Oct. 17, 1950 |
| 2,664,802 | Myer | Jan. 5, 1954 |
| 2,694,967 | Severence | Nov. 23, 1954 |

FOREIGN PATENTS

| | | |
|---|---|---|
| 664,746 | France | Apr. 29, 1929 |